United States Patent
Singh

(10) Patent No.: US 7,336,682 B2
(45) Date of Patent: Feb. 26, 2008

(54) NETWORK ARCHITECTURE AND METHODS FOR TRANSPARENT ON-LINE CROSS-SESSIONAL ENCODING AND TRANSPORT OF NETWORK COMMUNICATIONS DATA

(75) Inventor: Amit P Singh, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1258 days.

(21) Appl. No.: 09/915,939

(22) Filed: Jul. 25, 2001

(65) Prior Publication Data

US 2002/0071438 A1 Jun. 13, 2002

Related U.S. Application Data

(60) Provisional application No. 60/221,262, filed on Jul. 25, 2000.

(51) Int. Cl.
*H04J 3/24* (2006.01)
(52) U.S. Cl. ............... 370/474; 370/392; 709/242
(58) Field of Classification Search ............ 370/469, 370/471, 475, 393; 341/4, 13, 51
See application file for complete search history.

(56) References Cited

U.S. PATENT DOCUMENTS

| | | | | |
|---|---|---|---|---|
| 4,322,795 A | * | 3/1982 | Lange et al. | 711/136 |
| 4,876,541 A | * | 10/1989 | Storer | 341/51 |
| 5,049,881 A | | 9/1991 | Gibson et al. | |
| 5,087,913 A | | 2/1992 | Eastman | |
| 5,307,413 A | | 4/1994 | Denzer | |
| 5,371,499 A | * | 12/1994 | Graybill et al. | 341/51 |
| 5,377,329 A | * | 12/1994 | Seitz | 710/54 |
| 5,394,879 A | * | 3/1995 | Gorman | 600/520 |
| 5,450,562 A | * | 9/1995 | Rosenberg et al. | 711/119 |
| 5,485,526 A | * | 1/1996 | Tobin | 382/232 |
| 5,633,871 A | | 5/1997 | Bloks | 370/471 |
| 5,864,554 A | * | 1/1999 | Rostoker et al. | 370/395.6 |
| 5,867,114 A | | 2/1999 | Barbir | |

(Continued)

OTHER PUBLICATIONS

Liu, Z. et al., Scalable Robust Efficient Dictionary-Based Compression (SCRIBE), Mar. 22, 2001, [online] [Retrieved on Feb. 21, 2005] Retrieved from the Internet <URL:http://www.watersprings.org/pub/id/draft-liu-rohc-scribe-00.txt>.

(Continued)

*Primary Examiner*—Chi Pham
*Assistant Examiner*—Kevin Mew
(74) *Attorney, Agent, or Firm*—Shumaker & Sieffert, P.A.

(57) ABSTRACT

A computer implemented method and system for transferring data packets includes intercepting a stream of data packets at the connectionless network layer from a client or server, encoding and encapsulating the data packets, transmitting the encoded data packets, decoding and decapsulating the data packets, and injecting the decoded and decapsulated data packets into the connectionless network layer at a client or server. The encoding of the packets is based on detecting repetitions that could exist anywhere in the data stream. The repetitions are not necessarily within a single packet but could occur across multiple packets and multiple sessions. One of the encoding algorithms includes comparing the payloads of packets with identical signatures and transmitting the full packet only when the payload had not previously been sent.

89 Claims, 7 Drawing Sheets

U.S. PATENT DOCUMENTS

| | | | | |
|---|---|---|---|---|
| 5,892,549 | A | * | 4/1999 | Feng ............... 375/240.22 |
| 5,903,230 | A | * | 5/1999 | Masenas ............... 341/51 |
| 5,966,385 | A | | 10/1999 | Fujii et al. ............... 370/465 |
| 5,996,022 | A | | 11/1999 | Krueger et al. |
| 6,014,712 | A | | 1/2000 | Islam et al. ............... 709/246 |
| 6,100,824 | A | | 8/2000 | MacLeod et al. |
| 6,339,595 | B1 | | 1/2002 | Rekhter et al. |
| 6,351,465 | B1 | | 2/2002 | Han |
| 6,456,209 | B1 | | 9/2002 | Savari |
| 6,484,210 | B1 | * | 11/2002 | Adriano et al. ............ 709/239 |
| 6,490,356 | B1 | * | 12/2002 | Beuque ............... 380/239 |
| 6,498,809 | B1 | | 12/2002 | Dean et al. |
| 6,584,093 | B1 | | 6/2003 | Salama et al. |
| 6,614,785 | B1 | * | 9/2003 | Huai et al. ............... 370/352 |
| 6,665,725 | B1 | * | 12/2003 | Dietz et al. ............... 709/230 |
| 6,771,646 | B1 | * | 8/2004 | Sarkissian et al. ......... 370/392 |
| 6,822,589 | B1 | * | 11/2004 | Dye et al. ............... 341/51 |
| 6,907,048 | B1 | * | 6/2005 | Treadaway et al. ......... 370/474 |
| 2001/0056416 | A1 | * | 12/2001 | Garcia-Luna-Aceves ....... 707/2 |
| 2002/0044553 | A1 | | 4/2002 | Chakravorty |
| 2002/0184390 | A1 | * | 12/2002 | Alkhatib ............... 709/245 |
| 2003/0058856 | A1 | * | 3/2003 | Salett et al. ............... 370/389 |
| 2005/0105506 | A1 | * | 5/2005 | Birdwell et al. ............ 370/349 |

OTHER PUBLICATIONS

Nevill-Manning, C. et al., "Compression And Explanation Using Hierarchical Grammars," The Computer Journal, 1997, pp. 103-116, vol. 40, No. 2/3.

Nevill-Manning, C. et al., "Identifying Hierarchical Structure In Sequences: A Linear-Time Algorithm," Journal of Artificial Intelligence Research, Sep. 1997, pp. 67-82, vol. 7.

Nevill-Manning, C. et al., "Linear Time, Incremental Hierarchy Inference For Compression," Data Compression Conference, 1997, DDC '97, Proceedings Snowbird, Mar. 25-27, 1997, Los Alamitos, CA, USA, IEEE Comput. Soc., Mar. 25, 1997, pp. 3-11.

Nevill-Manning, C. et al., "Phrase Hierarchy Inference And Compression In Bounded Space," Data Compression Conference, 1998, DCC '98, Proceedings Snowbird, Mar. 1-Apr. 1998, Los Alamitos, CA, USA, IEEE Comput. Soc., Mar. 30, 1998, pp. 179-188.

Supplementary European Search Report of European Application No. 01955862.6, Feb. 22, 2005, 3 pages.

Banga, G. et al., "Optimistic Deltas for WWW Latency Reduction," 1997 Annual Technical Conference, Usenix Association, 1997, pp. 289-303.

Chi, C. et al., "Compression Proxy Server: Design And Implementation," Proceedings Of USITS'99: The 2nd USENIX Symposium On Internet Technologies & Systems, The Usenix Association, Oct. 11-14, 1999, 13 pages.

Communication, EP 01959237.7, Jun. 9, 2005, 5 pages.

Heywood, P., "Compression And Routers, Together At Last," International News Analysis, Data Communications, Apr. 24, 1995, pp. 55-56, 61-63, No. 5.

Nand, A. et al., "Mail Servers With Embedded Data Compression Mechanism," IEEE, 1998, p. 566.

Nevill-Manning, C. et al., "Compression And Explanation Using Hierarchical Grammars," The Computer Journal, 1997, pp. 103-116, vol. 40.

Sheu, S. et al., "A Link Level Compression Strategy For High-Speed Backbone ATM Networks," pp. 1-5.

First Substantive Examination Report from the European Patent Office for Application No. 01 959 237.7-2223, dated Aug. 18, 2005, 5 pgs.

Second Substantive Examination Report from the European Patent Office for Application No. 01 959 237.7-2223, dated Apr. 25, 2006, 5 pgs.

* cited by examiner

NETWORK ARCHITECTURE AND METHODS FOR TRANSPARENT ON-LINE CROSS-SESSIONAL ENCODING AND TRANSPORT OF NETWORK COMMUNICATIONS DATA

CROSS-REFERENCE TO RELATED APPLICATION

This application claims priority from U.S. Provisional Patent Application Ser. No. 60/221,262, "System and Method for Transparent On-line Encoding and Transport of Network Communications Data," filed Jul. 25, 2000, which is incorporated by reference herein in its entirety. This application is related to U.S. patent application Ser. No. 09/872,184, "System and Method for Incremental and Continuous Data Compression," filed May 31, 2001, having inventor Amit P. Singh and also claiming priority to U.S. Provisional Patent Application Ser. No. 60/221,262. This application is related to U.S. patent application Ser. No. 10/226,502, "Efficient Method & System for Automatic Discovery and Verification of Optimal Paths Through A Dynamic Multi-Point Meshed Overlay Network," filed Aug. 23, 2002, having inventors Anupam A. Bharali, Balraj Singh, Manish H. Sampat, Amit P. Singh, and Rajiv Batra and also claiming priority to U.S. Provisional Patent Application Ser. No. 60/314,692 having a filing date of Aug. 24, 2001.

BACKGROUND

A. Technical Field

The present invention relates generally to networking and the communication of data over a network, and more particularly, to transparent on-line encoding and decoding of a continuous stream of network communications data.

B. Background of the Invention

Due to the exponential growth of network communications traffic, the amount of bandwidth available for transmission of data is often exceeded by the amount of data to be transmitted. This high demand for bandwidth results in network congestion and communication delays. One way to address this problem of limited bandwidth availability is to encode the transmitted data in a more efficient format. This encoding process reduces the size of the data and can therefore be referred to as data compression. The encoded or compressed data contains the same information as the original data but requires fewer bits to be stored or transmitted. The encoding or compression process is referred to as a loss-less process if the original data can be exactly recovered from the encoded or compressed data.

The Open Systems Interconnection (OSI) Reference Model is a widely used model describing the flow of data across a network. The OSI model has seven layers. Each of the seven layers communicates with the layer below it through a specific interface and to its peer layer on a different system on the network through a specific protocol. The combination of all networking layers is often referred to as the networking stack.

The lowest layer (layer 1) of the OSI model is the physical layer. It addresses the transmission of bits of information across a physical link. The next layer (layer 2) is the data link layer, which addresses transmission of blocks of data across a link provided by the physical layer. The data link layer addresses issues such as sharing media with multiple systems connected to a network (e.g., ethernet), addressing of systems that are directly connected to each other, and computing checksums of the transmitted blocks of data. The next layer (layer 3) is the network layer, which allows any two systems on the network to talk to each other even if they are not directly connected with a physical link. Hence, the network layer performs route calculations based on a destination address and accordingly routes packets of information across a network. The next layer (layer 4) is the transport layer which provides a flow of data between two systems. The transport layer operates on an entire flow of data between two systems rather than on individual packets of data. TCP (Transmission Control Protocol) is one of the protocols of the transport layer. TCP provides reliable transport of data between two systems by ensuring that all information transmitted from one system to another is actually received and is received in the order that it was transmitted. The TCP protocols provide this functionality by dealing with errors such as lost and reordered packets. The next three layers are the session layer (layer 5), presentation layer (layer 6) and the application layer (layer 7). The application layer (layer 7) is the highest layer of the OSI model and is usually the interface that is provided to system users. For example, an email message is generated at the application level by a user and is processed in turn by each of the seven networking layers to be finally transmitted on the network. A more detailed description of the OSI model is set forth in Tanenbaum, *Computer Networks*, 2d Ed. (1989) which is incorporated by reference herein in its entirety.

The communication between two systems can be broadly classified into two categories: connectionless and connection-oriented. Connectionless communication occurs when the data is presented as an independent package including address information, and the network delivers each package independent of all other packages being exchanged on the network. Connection-oriented communication occurs when two systems first execute a set-up procedure to create a real or virtual connection and then exchange multiple pieces of data over the same connection.

The packet based TCP/IP (Transmission Control Protocol/Internet Protocol) protocols are two of the most widely known protocols of the Internet. IP is a network layer protocol that defines a set of standards for the addressing and routing of packets across a connectionless network. TCP is a connection-oriented transport layer protocol that defines a means for ensuring reliable transport of information across a network. Note that IP is considered connectionless since each packet is treated independently. TCP on the other hand is connection-oriented since it involves first setting up a TCP connection between the two systems after which all pieces of data utilize the same virtual link. Note that a connection-oriented service, such as TCP, can be implemented over a connectionless layer, such as IP.

Encoding or compression of network communications data can be performed at different layers of the networking stack. Traditionally, data is encoded at the application layer (layer 7). For instance, images can be encoded in a variety of formats, such as the Graphics Interchange Format (gif) or Joint Photographic Experts Group format (jpeg). These encoding formats reduce the space required for storage or transmission of the image. Hence, at the application level the server can encode all of its images in the "gif" format before transmission to the client. Each image received by the client is then decoded at the application level to generate the original viewable image. This form of application layer encoding or compression is usually performed off-line on single objects prior to transmission. Application layer encoding is not performed in an on-line fashion to a continuous communication stream consisting of multiple objects. Hence, off-line application level encoders are based only on intra-object information (i.e., information from a single object) rather than inter-object information (i.e., information from all of the different objects transmitted from one or more servers to one or more clients).

Since the transport level of the OSI model is a connection-oriented service, on-line encoding techniques applied at this level will effectively be encoding a connection-oriented link. Hence the encoding will only be performed on the data that is transmitted within a single connection or single flow. In a client-server architecture, since each connection is between the server and a single client, an independent encoding process will have to be executed for every client. Similarly, there will need to exist an independent decoder for every client that receives data from the server. Thus on-line encoding of a connection-oriented link can only be effectively performed when the number of connections (i.e., sessions or flows) is small, i.e., the server only communicates with a single or a few clients. In addition, encoding data within a single connection will not be as effective as encoding all of the connections together in the same process because the encoding process will only be able detect repetitions that exist within the same session. For instance there may be several data patterns or objects that are transmitted only once in each independent layer 4 session (e.g., a TCP session). In this example, if the encoder examines each session independently it will not detect any repetitions since each object or pattern is transmitted only once per session. On the other hand, if the encoder examines all of the data traffic across all of the sessions, it will detect many more repetitions and hence it will encode the traffic more efficiently.

Other implementations of encoding or compression in the networking domain have been based encoding traffic at the connection-less layer 3. These layer 3 encoding techniques have been based only on intra-packet encoding. Hence, these systems encode each packet or datagram independently based only on the information within the current packet. They cannot, therefore, detect repetitions of entire packets or repetitions that exist across multiple packets. These intra-packet layer 3 encoding techniques therefore miss many repetitions and do not yield a high degree of data reduction.

Accordingly it is desirable to provide improved efficiency of data transmission and bandwidth utilization. Current encoding schemes are limited by the amount of data that they examine and hence they can only detect a small fraction of the total number of repetitions that exist in all of the network communications traffic. For instance, encoding schemes that encode each packet independently can only detect repetitions that exist within the same packet. Similarly, encoding schemes that treat each session independently can only detect repetitions that exist within the same session. Also, encoding schemes that are based on specific applications or data types can only detect repetitions that exist within the data of that specific type. In all of these cases, repetitions that occur across packets or across sessions or across data types are never detected. Hence current encoding schemes are not efficient and yield only a relatively small degree of data reduction.

SUMMARY OF THE INVENTION

The present invention provides a method and system for on-line transparent cross-sessional encoding of data packets. One embodiment of the present invention intercepts, encodes and encapsulates a stream of data packets. It then transmits the encoded and encapsulated data packets, decodes and decapsulates the data packets, and re-injects the decoded and decapsulated data packets at the connectionless network level. The present invention can encode and decode multiple streams of data from multiple communication sessions by finding and eliminating repetitions that occur anywhere in the data stream (i.e., both within and across multiple packets and sessions). One embodiment of the invention intercepts packets at the connection-less network layer (layer 3) of the network stack. Because this embodiment of the invention operates at the connectionless network layer (or at lower layers), it is transparent to the network, servers, applications, and any other network devices. Since the invention picks up and processes packets at layer 3 or below, all higher layers (e.g., layer 4, 5, 6, and 7) can still interact with the layer 3 interfaces in exactly the same way.

The invention can use any encoding algorithm to encode the data that it processes. Previous encoding techniques have only been able to use encoding algorithms that look for repetitions within a single packet or a single object. The present invention can use any inter-object, inter-packet, or inter-session encoding algorithm in addition to the any intra-object and intra-packet encoding algorithms. That is, the current invention allows the encoding algorithm to find widely spaced repetitions that occur anywhere in the data stream (i.e., across many different and independent packets, objects, or sessions). In one embodiment of the invention, the encoding algorithm looks for repetitions of any block of data between multiple packets or datagrams that are transmitted across the network. These repeated blocks of data are encoded in a more efficient format by replacing them with a unique identifier that uniquely identifies the contents of that data block.

DETAILED DESCRIPTION OF THE PREFERRED EMBODIMENTS

Figure 1:
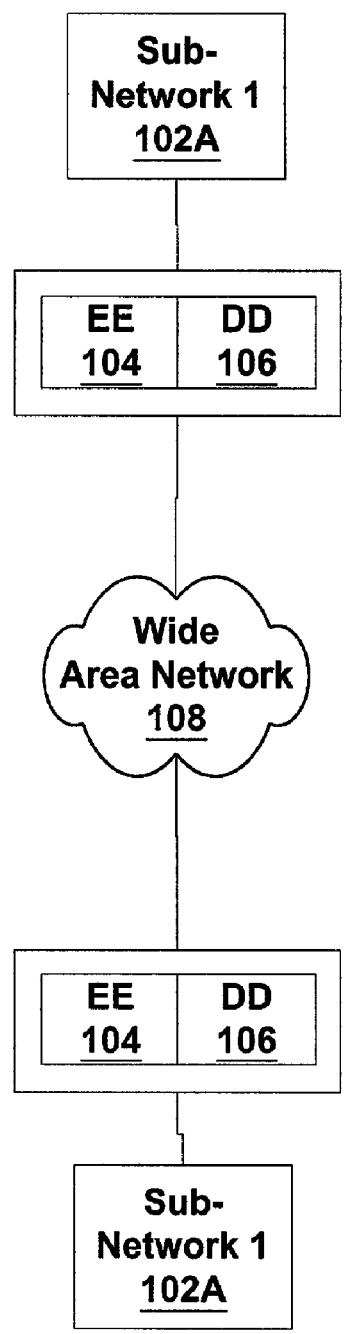
FIG. 1 is an illustration of a network in which the present invention resides.

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1 is an illustration of a network including the present invention. In this embodiment the network includes two sub-networks 102 that are connected by a network connection or link. The network connection can be any physical or logical means of interconnecting the two separate networks such as a private leased line, a frame relay circuit, or a virtual private network. The two sub-networks 102 could be geographically separated by any distance. For example, the two sub-networks 102 could be two remote offices of a corporation which are geographically separated and connected together by a Wide Area Network (WAN) link. Each remote office includes of a Local Area Network (LAN).

The invention includes two modules, an encoding and encapsulation module (EE) 104 and a decoding and decapsulation module (DD) 106. The EE module 104 encodes and encapsulates the packets of communication traffic. The DD module 106 decapsulates and decodes the traffic that has been encoded by an EE module 104 to re-create the original traffic. Hence, there needs to exist a corresponding DD module 106 for every EE module 104. In FIG. 1, each end of the WAN link has one EE and one DD module 106. Hence, in this case traffic from either sub-network to the other sub-network will be encoded by an EE module 104 and decoded by the DD module 106. The EE module 104 and DD module 106 on the same side of a network link could reside on the same physical device or box. Each EE module 104 and DD module 106 would simply be a different processes that runs on the same hardware platform. The EE module 104 and DD module 106 may be embodied as software running on a processor, as specially designed hardware, as firmware, or as a combination.

The data packets are converted by the EE module 104 into a more compact and efficient format and then re-converted back to their original size by the DD module 106. Hence, in the example illustrated in FIG. 1, the region of the network that is experiencing an improved level of efficiency of data transport due to the invention is the Wide Are Network link. In most cases, the WAN link is the most expensive component of a network and hence the component that is experiencing the maximum demand of bandwidth. Therefore, the invention can be used to increase the efficiency of data transport across the WAN 108 by encoding each WAN packet in a more efficient and smaller format.

The invention can encode and encapsulate data and decode and decapsulate data at any point in the network. As mentioned above, FIG. 1 illustrates the use of the invention across the WAN segment 108 of the network. The physical transmission medium as well as the communication protocols used in the WAN and LAN are often different. Since the invention encapsulates the encoded packets before transmission, it can reside on either the WAN or the LAN interface.

For instance in FIG. 1, even though the invention is optimizing traffic across the WAN, the EE module 104 can be placed on the LAN side just before the LAN-to-WAN edge router or other edge device that converts the LAN packets into the correct format for transmission across the WAN. In this case, all packets that are destined to go to this edge device will first be transmitted through the EE module 104 of the invention. Similarly the DD module 106 of the invention can, in this case, reside on the LAN side immediately after the WAN-to-LAN edge device. Hence, both EE 104 and DD 106 modules are actually deployed within the LAN though they are processing only traffic that is destined to travel across the WAN 108. In the case that the invention is designed to reside within the LAN, the actual location of the invention in the LAN can vary depending of the architecture of the network. The EE module 104 can reside anywhere within the LAN as long as the packets of data that need to be encoded can reach the EE module 104. Similarly, the DD module 106 can reside anywhere within the LAN, as long as the encoded packets can be sent to the DD module 106 for decoding and the DD module 106 can transmit the decoded packets to their destination.

In one embodiment, the invention can be completely transparent to the LAN and WAN network and appear to be a two port layer 3 LAN switch. In this embodiment, the invention is not a routing node and acts as an intermediate device between two routed nodes in the network. In this case, the only packets that the EE module 104 of the invention can encode will be the packets that traverse these two nodes of the network. This is referred to as the non-routed operation mode of the invention. If the invention is used in non-routed mode and if the user of the invention wishes to process all WAN traffic (as described above), then an appropriate point in the LAN to install the invention is just before the edge router of the LAN. Another embodiment of the invention is the routed operation mode. In this mode the invention acts like a routed node of the LAN. In this case, the invention can be installed virtually anywhere in the LAN since any packets that need to be encoded by the EE module 104 can the routed to the invention.

Since both the non-routed and routed embodiments of the invention operate at layer 3 in the LAN, they will be transparent to all higher layers of the networking stack. Therefore, the invention can also choose to not process certain packets and transparently forward them through to the next node in the network. In this case, the invention simply takes the packet from layer 3 and re-injects the packet out on the network at layer 3. Since the packet is not encoded, it is not necessary for the packet to be encapsulated and transmitted to a corresponding DD device for decapsulation and decoding.

In the non-routed embodiment of the invention, the invention performs no routing functions and could, for network connectivity and architecture purposes, be looked upon as a physical wire or link. In addition, since the invention is logically transparent to other network applications and protocols, it could be replaced with a wire if the network operator did not wish to have any packets encoded. This fact can be used by the invention to provide a high level of reliability by providing a "switch-to-wire" module that physically disconnects the device from the network and effectively replaces the device with a physical wire. The implementation of this functionality can be achieved by using physical relays that switch connectivity between different end points. This switch to wire functionality can be triggered under any fault conditions including for example loss of power to the invention. Under these conditions, the relays will switch positions such that the data packets will directly be taken from the physical input port and put on the physical output port. Under non-fault conditions the relays will instead connect the input port to the physical input interface of the EE 104 and DD 106 modules and the output port physical output interface of the EE 104 and DD 106 modules.

In any LAN based embodiment, the invention can process LAN routing information to discover the sub-networks and addresses that the DD module 106 of the invention can communicate with. For instance, the DD module 106 of the invention can listen for the open shortest path first protocol (OSPF) or routing information protocol (RIP) protocol packets that communicate routing information. If the invention is in the non-routed mode, the DD module 106 only needs to listen for these routing packets and does not have to participate in these routing protocols. The DD module 106 of the invention communicates to its corresponding EE module 104, all of the sub-networks and addresses that the DD module 106 can communicate with (on its local LAN). The corresponding EE module 104 makes sure that only packets destined for these sub-networks and addresses are encoded and transmitted to this particular DD module 106. Hence, when the EE module 104 receives a packet to process, it first makes a decision as to whether or not the packet is destined for an address that the corresponding DD module 106 can support. If the address belongs to a LAN sub-network that the DD module 106 can communicate with, then the packet is encoded and encapsulated and transmitted to the DD module 106. If not, then the packet is not encoded and is transparently forwarded through the invention. In this manner the EE module 104 of the invention can use routing information derived from the DD module 106 to decide which packets to process. Also, in the case when there are multiple DD modules 106 in the network and more than one DD module 106 reports the same address or subnetwork that it can support, then the routing cost or distance from that address to the multiple DDs can be used to determine which EE/DD pair should process the packet.

Since all encoded packets must be decoded by a DD module 106, the EE module 104 must guarantee that any packets that it encodes can be correctly decoded by the corresponding DD module 106. In order to provide this guarantee, the invention uses a synchronization mechanism between the EE 104 and DD 106 modules to ensure that the encoding and decoding algorithms are correctly synchronized. An example of such a synchronization system is described below.

In one embodiment, the invention picks up packets for transmission at the connection-less network layer (i.e., layer 3). In this embodiment the EE module 104 of the invention will encode each layer 3 packet or datagram and encapsulate the encoded packet in communication tunnel that is destined specifically for the corresponding DD module 106. The encapsulation can be performed by any encapsulation protocol that ensures that the encoded packets will be routed to the corresponding DD module 106. Some of the possible encapsulation protocols include, TCP, UDP, and IP-in-IP. The choice of encapsulation protocol will impact the encoding technique that is used to encode each packet. For instance, if a reliable transport protocol such as TCP is used to encapsulate each encoded packet, then the encoding algorithm may not need be explicitly synchronized with the decoding algorithm on the DD module 106. On the other hand, if a non-reliable protocol such as UDP is used to encapsulate the encoded packets, then the encoding algorithm will require a separate reliable synchronization channel with the DD module 106 to ensure that all encoded packets are correctly decoded. The reason for this difference is that when a reliable transport protocol such as TCP is used for encapsulation, the EE 104 and DD 106 modules can be guaranteed that there will be no data loss between them and that the order of processed packets leaving the EE module 104 will the same as the order in which they are delivered (from TCP) at the DD module 106. Under these conditions it is possible for a corresponding pair of EE 104 and DD 106 modules to ensure that their encoding and decoding algorithms are synchronized based on the fact that the state of each algorithm is deterministically computed as a function of the data that is processed. Hence if the encoding and decoding algorithms have the same synchronization parameters and they are given exactly the same data to process in the same order, then they will by definition always maintain the same synchronization state. On the other hand, if there is the possibility of data loss or data re-ordering during transmission of encoded data from the EE to DD module 106 (e.g., if UDP is used to encapsulate the encoded packets) then the invention can use a separate synchronization channel to explicitly ensure that the DD module 106 is synchronized with the EE module 104 and can accurately decode all of the encoded data it receives.

Figure 2:
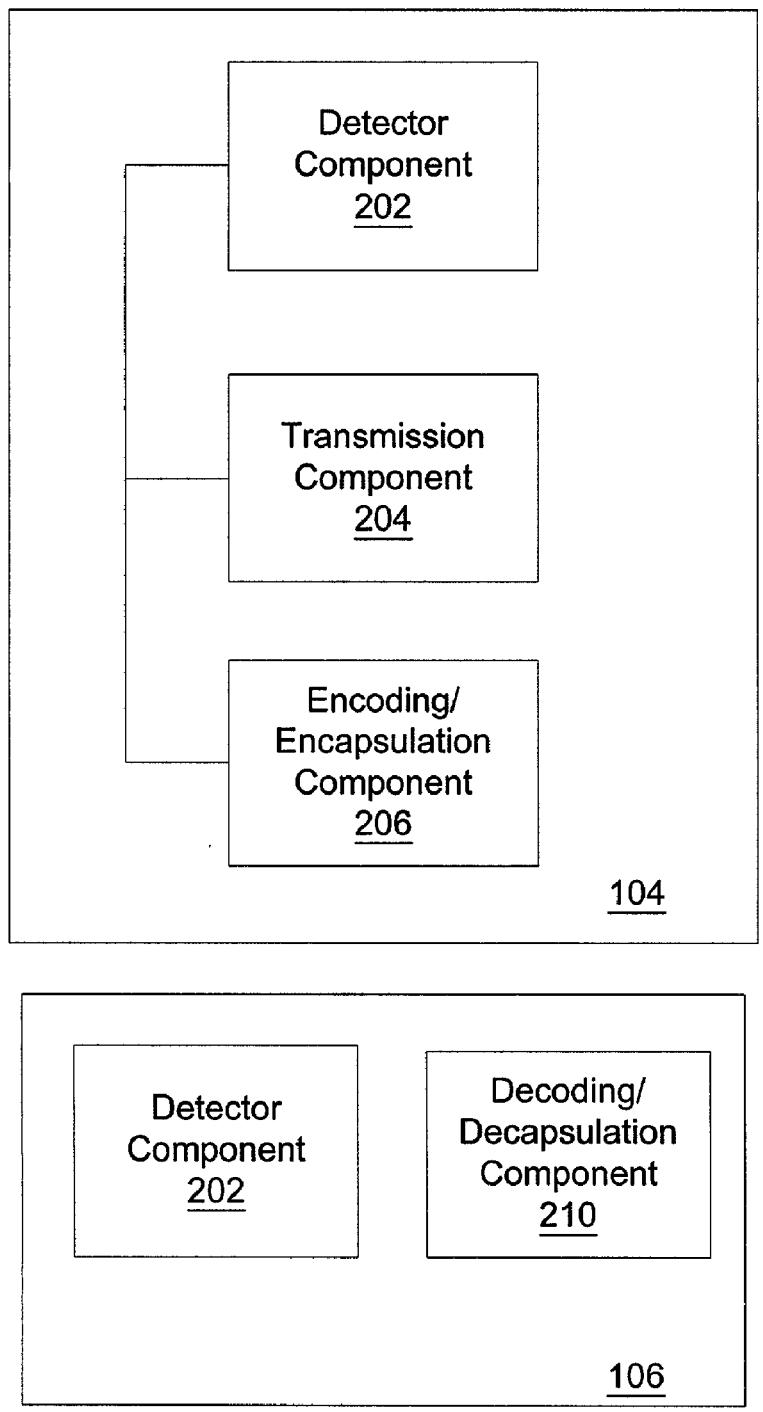
FIG. 2 is an illustration of the EE and DD modules according to an embodiment of the present invention.

FIG. 2 is an illustration of an EE module 104 and a DD module 106 according to one embodiment of the present invention. The EE module 104 includes a detector component 202, a transmission component 204 and an encoding/encapsulation component. The DD module 106 includes a detector component 202 and a decoding/decapsulation component 210. The operations performed by these modules are described herein.

The encapsulation of packets by the encoding component 206 of the EE module 104 can be accomplished by a variety of techniques. In one embodiment, each processed packet can be encapsulated in a single outbound packet after it has been encoded. In this case the number of input and output packets through the invention will be equal. In another embodiment, multiple encoded input packets can be encapsulated together in a single outbound encapsulated packet. The number of encoded packets that are encapsulated into a single output packet can vary and can be adjusted to prevent the size of output packets from exceeding a given fixed size (e.g., the maximum transferable unit size). If multiple packets are encapsulated the number of output packets will be less than the number of input packets for the EE module 104. Similarly, the number of output packets will be larger the number of input packets for the DD module 106. In this embodiment an encoded input packet may be held in a buffer to allow for additional input packets to be encapsulated together. For example, if the encoded packet occupies only 500 bytes and the maximum size of the encapsulated packet is 1000 bytes, then the encoded packet may be held in a buffer until an additional 500 bytes are added to the output buffer. This embodiment also uses a timer mechanism to ensure that each encoded packet is held in the buffer for no more than a predetermined maximum time. If an encoded packet or multiple encoded packets are held in the buffer for longer than the maximum time limit, all the encoded packets in the output buffer will be encapsulated and transmitted immediately (even if the total size of the encapsulated packet is smaller than the maximum size).

Figure 3A:
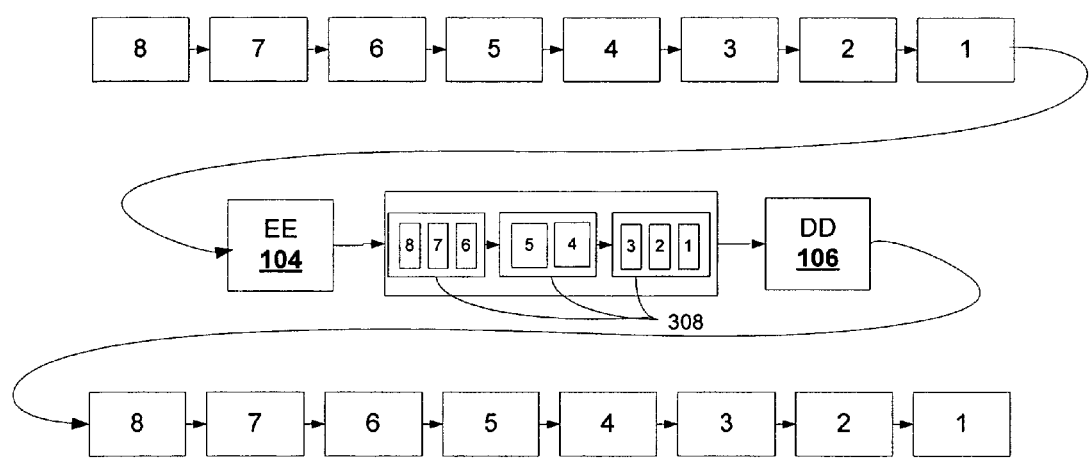
FIG. 3a is an illustration of packet processing by the EE and DD modules according to an embodiment of the present invention.

FIG. 3*a* is an illustration of a state diagram of one example of a packet stream as it is processed by an EE module 104 and DD module 106 according to one embodiment of the present invention. The eight packets after encoding are reduced to a size that occupies only three packets 308. These encoded packets 308 are encapsulated and transmitted to the DD module 106. The DD module 106 in turn decodes and decapsulates the stream it receives from the EE module 104 to generate the original connectionless stream of packets. These packets are then injected into the network directly at the network layer (layer 3). The invention, therefore, takes over and redirects the transmission of packets for the region of the network between the EE module 104 and the DD module 106. Since exactly the same packets that enter the EE module 104 at the network layer are transmitted from the DD module 104 at the network layer, the presence of the two boxes will be transparent to the source and destination machines. For instance, a connection oriented link between the source and destination, such as a TCP connection, will not be affected by the invention and can continue to function exactly as if the EE module 104 and DD module 106, were not present.

Figure 3B:
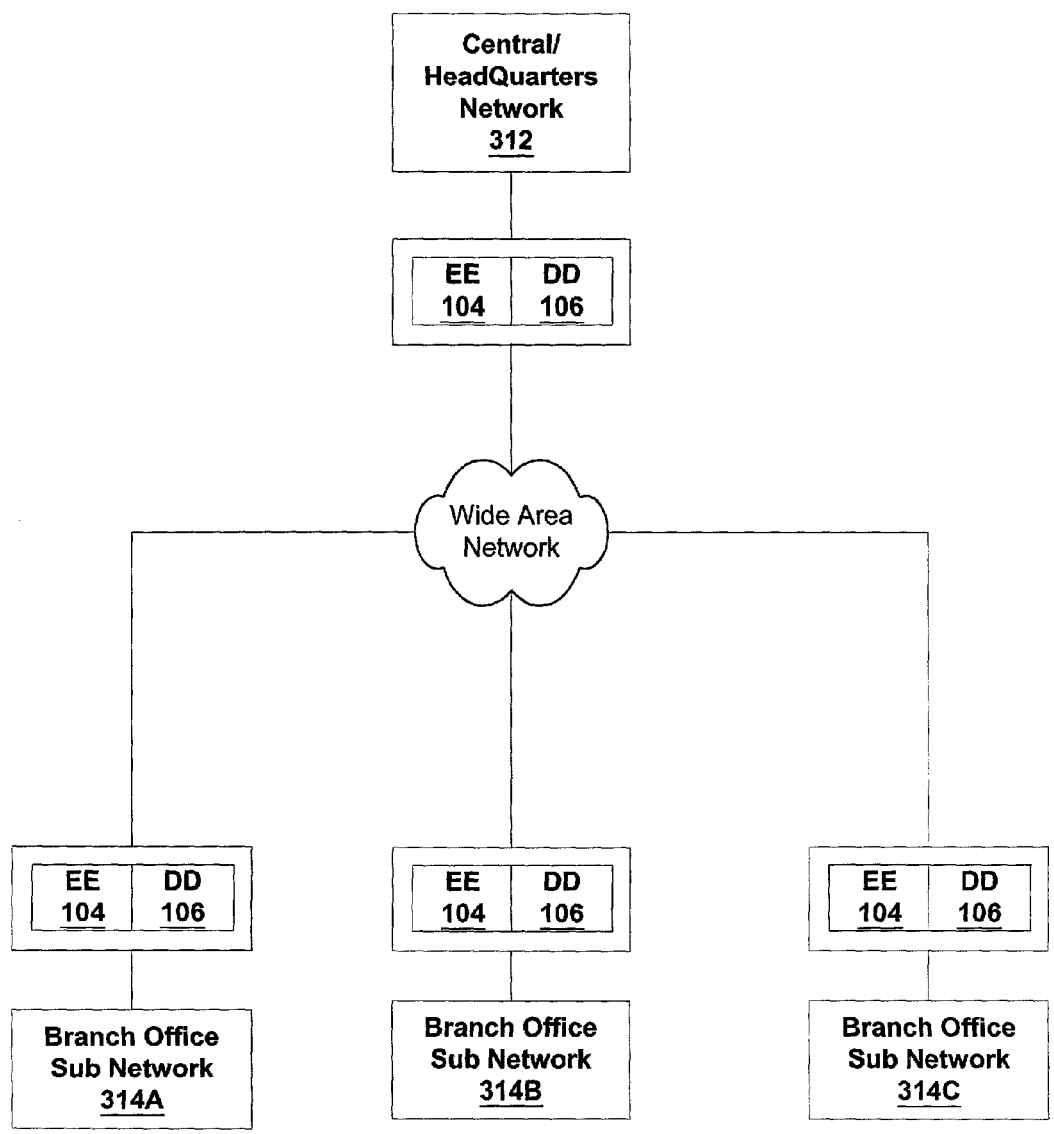
FIG. 3b is an illustration of a point-to-multipoint network according to an embodiment of the present invention.

FIG. 3*b* is an illustration of another embodiment of the present invention. This network is a logical extension of the network described in FIG. 1. The network in FIG. 3*b* is a point-to-multipoint network in which one sub-network is connected to multiple sub-networks. Again, as in FIG. 1 each sub-network may contain multiple systems that are connected by a Local Area Network (LAN). The connections between the respective sub-networks are through a Wide Area Network (WAN). In this case the global EE 104 and DD 106 modules at the center or hub of the network actually includes multiple EE and DD processes. All of these EE and DD processes may reside physically on the same device or box. Each EE and DD sub-process (sub-unit) at the hub corresponds to a specific EE and DD module 106 at each of the remote sub-networks. The global EE module 104 at the center or hub can collect the network topology information transferred from each of the remote DD modules 106 to determine which DD module 106 supports which sub-networks and address spaces. Hence, when the global EE module 104 at the hub picks up a packet, it uses the destination of the packet plus the network topology information to determine which specific EE/DD pair should process this packet. If a packet is destined for an address which is not supported by any remote DD module, then the packet is transparently passed through the EE module 104 (without being encoded or encapsulated). The encoding algorithms used by the invention can treat this point-to-multipoint extension in various ways by sharing encoding and synchronization data between the various EE and DD processes. All the various embodiments of the point-to-point version of the invention described in FIG. 1 and above can be applied to this point-to-multipoint embodiment as well. This is because the point-to-multipoint embodiment is a logical extension of the point-to-point embodiment.

The point-to-point and point-to-multipoint embodiments of the invention described above can be further extended to include the multipoint-to-multipoint configuration. In this case each sub-network in the global network may be directly connected to each other sub-network. The invention can support this configuration by allowing for multiple EE and DD processes to exist at each sub-network of the network. In this case, the invention will logically create a separate EE and DD process pair for each WAN link in the network. The multiple EE and DD processes that reside on the same side of a network link could all be located on the same physical device or on multiple devices. All the various embodiments of the point-to-point and point-to-multipoint versions of the invention described above can be applied to this multipoint-to-multipoint embodiment as well. This is because the multipoint-to-multipoint embodiment is a logical extension of the point-to-point and point-to-multipoint embodiments.

Figure 4:
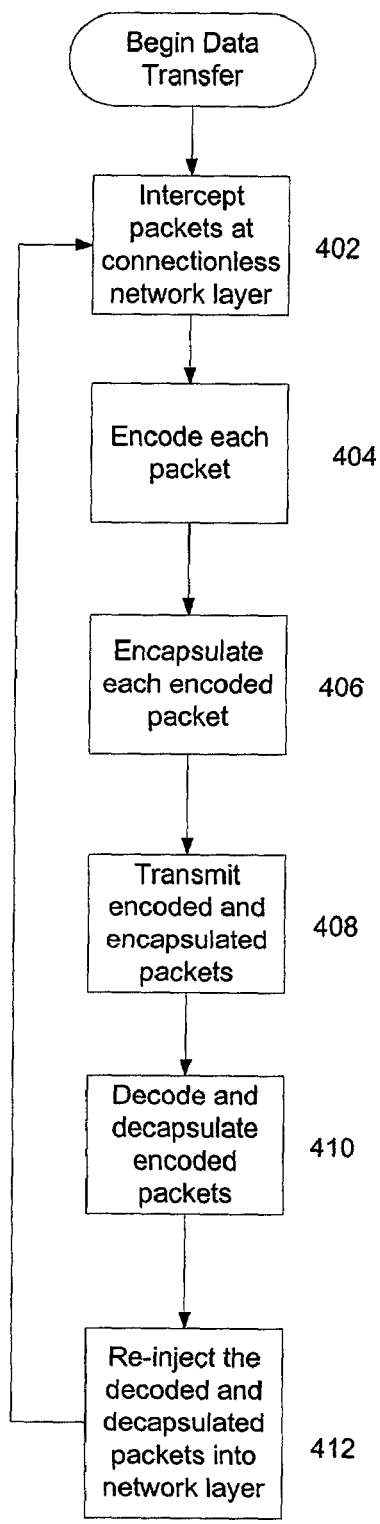
FIG. 4 is a flowchart of the process for encoding, encapsulating, decoding and decapsulating a data stream according to an embodiment of the present invention.

FIG. 4 is a flowchart of the process for encoding, encapsulating, decoding and decapsulating a data stream according to one embodiment of the present invention. The encoding algorithm in the encoding/encapsulation component 206 intercepts 402 packets at the connectionless network layer. The encoding algorithm then encodes 404 each packet and encapsulates 406 the encoded packets. The process for encoding the packets is discussed further below. The encoded and encapsulated packets are then transmitted 408 to the decoding algorithm. The packets are then decapsulated and decoded 410 by the decoding/decapsulation component 210. The process for decoding packets is discussed in more detail below. The DD module 106 then re-injects 412 the decoded and decapsulated packets into the connectionless network layer.

The invention can use any encoding algorithm to encode the data that it processes. As described above, previous encoding techniques have only been able to use encoding algorithms that look for repetitions within a single packet or a single object. The current invention can use any inter-object, inter-packet, or inter-session encoding algorithm in addition to the any intra-object and intra-packet encoding algorithms. That is, the current invention is the only technology that allows the encoding algorithm to find widely spaced repetitions that occur anywhere in the data stream (i.e., across many different and independent packets, objects, or sessions). One possible cross-sessional encoding algorithm that can be used with this invention is described in U.S. patent application Ser. No. 09/872,184 filed on May 31, 2001, titled "System and Method for Incremental and Continuous Data Compression" which is incorporated by reference herein in its entirety.

In another embodiment of the invention, the encoding algorithm looks for repetitions of any block of data between multiple packets or datagrams that are transmitted across the network. These repeated blocks of data are encoded in a more efficient format by replacing them with a unique identifier that uniquely identifies the contents of that data block. In this case, the encoding algorithm will identify two blocks of data that are identical across multiple packets and encode them in a highly compressed format. This encoding algorithm is referred to as the global block encoding algorithm. The block size for the global block encoding algorithm can vary. In one embodiment the block size can be the entire payload of the packet. In other embodiments of this invention the block size can be set to either any fixed size (e.g., 100 bytes) or to size that varies with each packet (e.g., one quarter the size of the payload of the current packet).

The global block encoding algorithm uses a signature function to identify the blocks of data that are identical. The signature function can also be referred to as the hash function. The encoding algorithm uses the hash function to compute a signature for the block of data based on the contents of that particular block. The signature of each data block is then compared to the signatures of previously transmitted data blocks. If there is no previously transmitted data block with a signature that is identical to the signature of the current data block, then the current data block is added to a table of data blocks and is then transmitted in its entirety (possibly with the addition of some additional synchronization tags). If the signatures of the current block and a previously transmitted data block are the same, then the invention compares the contents of the current block with the contents of the previous blocks that share the same signature. If the content of any previous block with the same signature are not identical, then the current data block is transmitted in its entirety (as in the previous case). If the content of the current data block is identical to the contents of a previous data block then the data block is replaced with special unique identifier. This replacement may be performed only if the encoding algorithm is sure that the decoding algorithm has associated this specific unique identifier with exactly the current contents of the data block. If the two algorithms have not yet synchronized this information, then the block may not be replaced with the identifier. This unique identifier will be used by the decoding algorithm to replace the original data block into the packet. In this manner, when multiple similar or identical packets are transmitted by one or more sources to one or more destinations, the invention can globally eliminate the transmission of entire blocks or payloads thus providing a much larger bandwidth reduction than would be possible if only intra-packet repetitions were eliminated.

Figure 5:
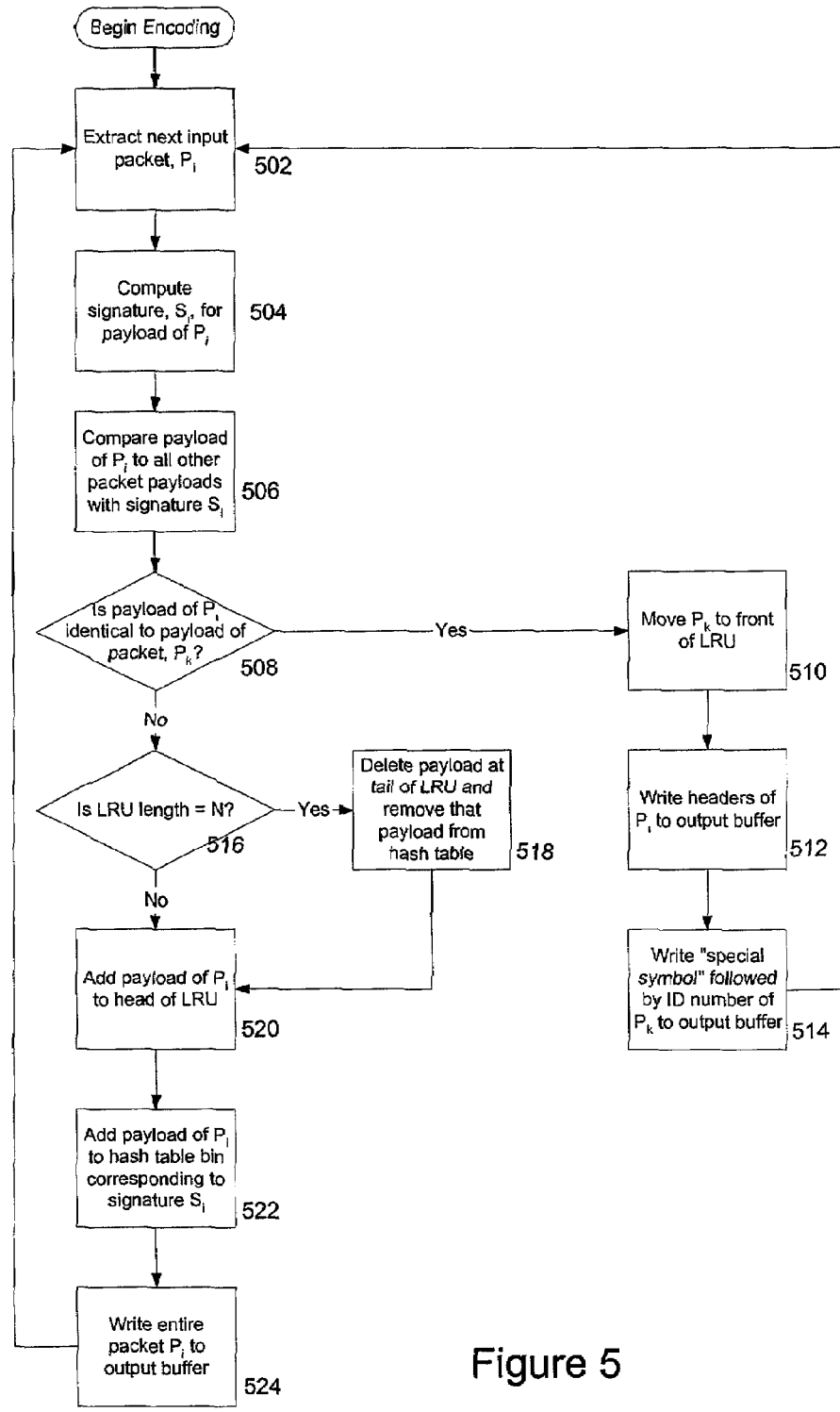
FIG. 5 is a flowchart of the encoding algorithm conducted by the EE module according to an embodiment of the present invention.

FIG. 5 is a flowchart of the global block encoding algorithm according to one embodiment of the present invention. For the purpose of this example, the block size used is the entire payload of the packet. As mentioned above, the block size does not have to be the entire payload and can instead be any fixed or variable number of bytes from the payload. One way to determine if a packet payload has been repeated is to compare the data in the payload to the last N previous packets that have been transmitted. This process could therefore require up to N comparisons of entire payloads for every input packet. In order to increase the efficiency of this search, the encoding algorithm uses a signature or hashing function that deterministically produces a specific signature for every packet payload. The signature function analyzes some or all of the bits of the payload and deterministically produces a signature based on these bits. If two payloads have different signatures they are guaranteed to be different since at least one of the bits from the two payloads have to be different to produce different signatures. If two payloads have the same signature, they may or may not be different depending on the signature or hash function that has been used. The lists of payloads for each signature value, $S_i$, can be implemented using a standard chained hash table. Hence, to retrieve all payloads with a signature, $S_i$, the program can simply look at the hash table bin corresponding to $S_i$.

The encoding and decoding algorithms keep a maximum of N payloads (or data blocks) in a local table. Each item (i.e., payload or data block) in this table is given a unique identification number. These identification numbers may be integers from 1 to N, for example. The encoding algorithm may use a Least Recently Used (LRU) data structure to keep only the last N unique packet payloads (or data blocks) in its table. The LRU can be implemented as a linked list or with any other appropriate data structure.

The performance of the global block encoding algorithm depends upon the signature functions it uses. If the signature function generates a completely unique signature for every unique packet, then each input packet will incur at most one comparison with a previously transmitted packet. However, if the signature function generates the same signature for many packets, then each packet could require several comparisons. For instance, if the signature function is simply the first bit of the payload, then approximately half of all transmitted packets are likely to have the same signature. Hence, for a table of N, each input packet would require approximately N/2 comparisons. Though a complex signature function results in fewer payload comparisons, the time required for computing the signature may be higher. Hence, a good tradeoff between the two extremes should be used. One example of signature function could be M bits from M previously chosen random positions in the payload. Another example of a signature function could be one or more binary functions to M bits from M random positions in the payload. Another example of a signature function could be the sum of all bytes or words in the payload. This signature or hashing function is similar to the check-sum of the payload. Many other signature functions could also be used. It is useful, although not necessary, for the final signature returned by the signature function to be a number that is less than the number of bins in the hash table. If this is the case, the signature can be used to simply index into the hash table and retrieve all previous payloads or data blocks that produced the same signature. In order to have the final signature be less than the number of hash table bins, the signature can be computed modulo the number of bins.

As described above, the encoding and decoding algorithms must be synchronized in order to ensure that all encoded packets can be accurately decoded by the DD module 106. In the case of the global block encoding algorithm, the tables that indicate which unique identifier corresponds to which data block must be synchronized. The encoding algorithm can only replace a given data block with the table identification number X, if it is certain that table identification number X on the decoding algorithm corresponds to exactly the same data block. This table synchronization can be achieved through multiple techniques. If the encapsulation protocol used between the EE 104 and DD 106 modules is a reliable transport protocol like TCP (i.e., one that guarantees delivery of all data in the correct order), then the two tables can be synchronized implicitly by ensuring that they are using exactly the same parameters (e.g., the size of the table). Since the data blocks that are stored in the table and kept in the LRU are chosen based on the order in which they arrive, the state of the encoding table is a function of the order in which the packets are processed and encoded by the encoding algorithm. By ensuring that the encoded packets are delivered in the same order to the decoding algorithm, the two systems can ensure that their respective tables and LRUs are always synchronized (i.e., contain the same data blocks at the same position in the table and LRU).

Figure 6:
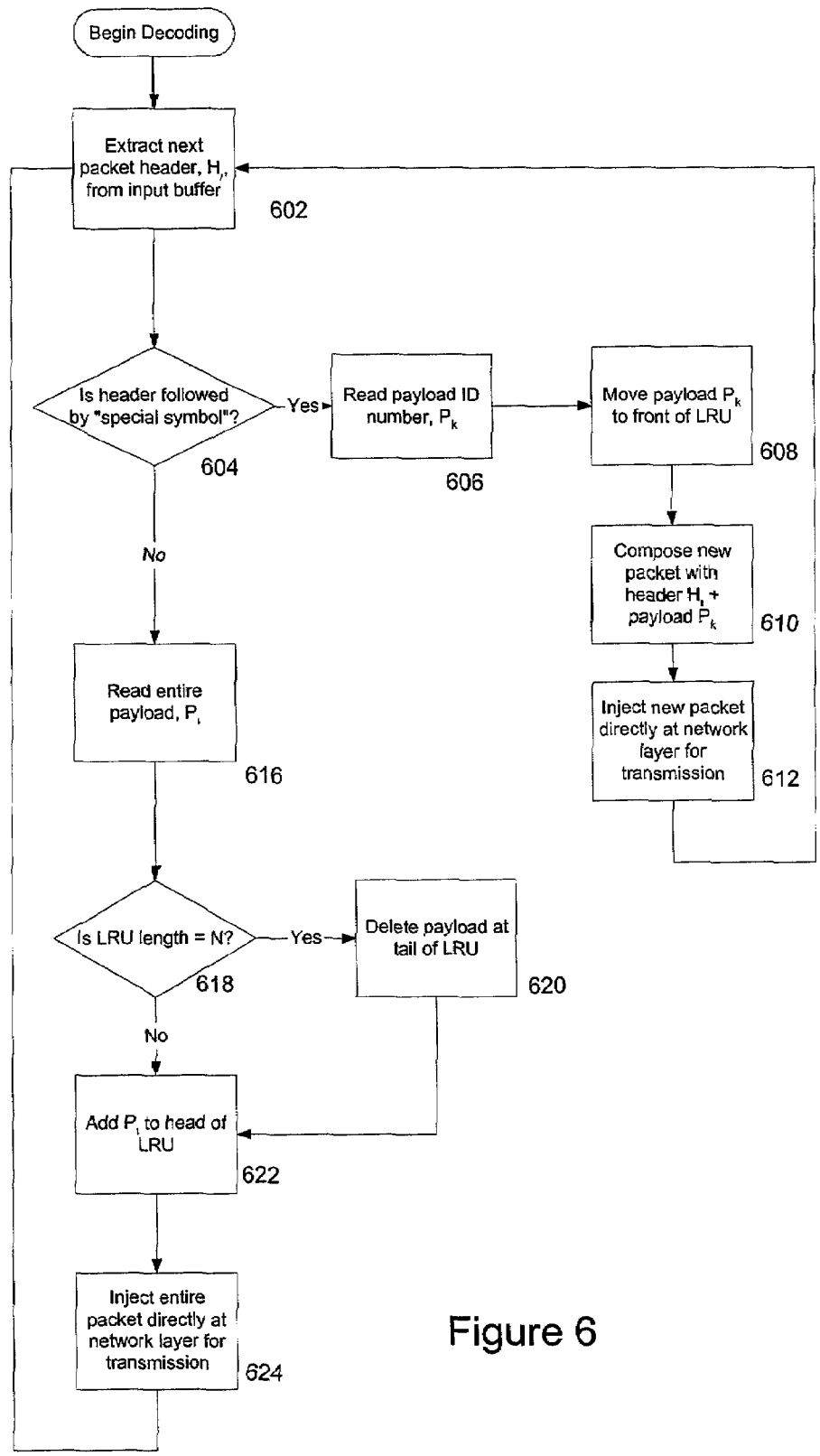
FIG. 6 is a flowchart of the decoding process conducted by the DD module according to an embodiment of the present invention.

The flow charts shown in FIGS. 5 and 6 are based on using a reliable transport protocol to encapsulate the encoded packets. The figures also assume that the block size for the global block encoding algorithm is the entire payload of the packet.

In conducting the encoding algorithm, the encoding algorithm first extracts 502 the next input packet, $P_i$ from a stream of data packets. The encoding algorithm then computes 504 a signature, $S_i$, for the payload of $P_i$. The encoding algorithm compares 506 the payload of $P_i$ to all other packet payloads that have the same signature, $S_i$. If the payload of $P_i$ is identical 508 to the payload of another packet, $P_k$, then $P_k$ is moved 510 to the front of the least recently used (LRU) list. The encoding algorithm writes 512 the headers of $P_i$ to the output buffer and also writes 514 a special symbol followed by the identification number of $P_k$ to the output buffer. This special symbol identifies the header as belonging to a packet whose payload has been previously transmitted. The special symbol can be any indicator that can be used by the decoding algorithm to identify packets whose payloads have been replaced by an identifier. For instance, the special symbol can be an unused bit in the header field that can be set to 1 when the payload is replaced with an identifier or 0 when the payload is sent unchanged. Since the packets are being encapsulated, the header fields can be changed as long as the change is reversed at the decoding end. In another embodiment, the encoding and decoding algorithms can assume that every packet, irrespective of whether or not the payload has been replaced will have an extra header of fixed length that indicates the state of the payload as well as the identification number. This extra header can be of any fixed length (e.g., 4 bytes) and be located immediately prior to the start of the payload. If the block size is smaller than the entire payload, the invention can insert this special identification header before each block. In this manner, the packets with identical payloads are transmitted only once as long as the previously transmitted packet is still on the LRU list. Once the data packet has been processed, the encoding algorithm then checks for the next input packet.

If the payload of $P_i$ is not identical 508 to the payload of packet, $P_k$, then the encoding algorithm determines 516 whether the LRU length is equal to N. If the length is equal to N packets, then the encoding algorithm deletes 518 the last payload in the list. This last payload is the least recently used payload and is hence removed from the encoding algorithm's table and replaced with a new payload. The deleted payload is also removed from the hash table. The new payload of packet $P_i$ is then added 520 to head of the LRU. The table entry number used for this new addition is the number of the table entry that was deleted from the tail of the LRU if a deletion was required (i.e., if the LRU length was already equal to N). If there was no deletion required then the length of the LRU was less than N and hence the table entry number is simply the length of LRU before addition of this new payload at the head. The encoding algorithm also adds 522 the payload of $P_i$ to the list of payloads with the signature, $S_i$. That is, the payload of $P_i$ is entered into the hash table in the bin that corresponds to the signature of the payload. The EE module 104 then writes 524 the entire packet, $P_i$, to the output buffer and checks for the next input packet.

FIG. 6 is a flowchart of the decoding process conducted by the decoding algorithm according to one embodiment of the present invention. The decoding algorithm extracts 602 the next packet header, $H_i$, from the input buffer. The decoding algorithm determines 604 whether the header is followed by a special symbol. As described above, the special symbol can also be a bit that has been set in the header. If so, the bit will be returned to its original state after it has been checked by the decoding algorithm. If the header is followed by a special symbol, then the decoding algorithm in the decoding/decapsulation component 210 reads 606 payload identification number $P_k$. The decoding algorithm moves 608 the payload $P_k$ to the front of the LRU list. The decoding algorithm then composes 610 a new data packet with a header $H_i$ and with payload $P_k$. The decoding algorithm injects 612 the new packet directly at the connectionless network layer for transmission.

If the header of the next packet is not followed by a special symbol, then the DD module 106 knows that the header is followed by the original payload of the packet. The decoding algorithm reads 616 the entire payload, $P_i$. If the LRU length is equal 618 to N, then the decoding algorithm deletes 620 the payload at the tail of the LRU list. In this example the decoding algorithm does not need to keep a hash table of all payloads since it does not need search for repeated payloads. Hence, when a payload is added or deleted by the decoding algorithm, it does not need to update any hash table. The decoding algorithm then adds 622 $P_i$ to the head of the LRU list. As in the case of the encoding algorithm, the table number for this new addition to the LRU is either the table number of payload that was deleted from tail of the LRU (i.e., if the LRU length is equal to N) or the length of the LRU before addition of this new payload to the head. The decoding algorithm then injects 624 the entire packet directly at the network layer for transmission. Since the size of the table and hence the length of the LRU are the same for the encoding and decoding algorithms, their tables are always implicitly synchronized since the same table identification numbers will point to the same payload for both algorithms. This is because in this embodiment, all processed packets are encapsulated by the encoding algorithm in a reliable transport channel. Hence, the order of payloads being processed by the encoding algorithm is exactly the same as the order in which the payloads are processed by the decoding algorithm. This in turn implies that the encoding and decoding LRUs which determine which payloads are stored in the table and which ones are deleted will always be implicitly synchronized and will add and delete the same payloads for both algorithms. The numbering schemes will also be identical which ensures that any table identifier that is transmitted by the encoding algorithm will always generate exactly the same original payload at the decoding algorithm.

The above encoding and decoding algorithms use a reliable transport channel to ensure that their tables are implicitly synchronized. In another embodiment of the invention, a non-reliable transport protocol such as UDP can be used to encapsulate the encoded packets. In this embodiment, the invention can use an explicit synchronization mechanism to ensure that the two tables are synchronized. The explicit synchronization uses a separate reliable transport channel between the EE 104 and DD 106 modules that is used for communication of table synchronization messages. This explicit synchronization mechanism is a modification of the implicit synchronization technique described above. The explicit synchronization requires each payload to be transmitted from the encoding algorithm with a status header that indicates to the decoding algorithm the current status of this payload. For instance, consider the case that the encoding algorithm receives a unique payload that it has never seen before. In this case, the encoding algorithm will, as described in FIG. 5, add the payload to its tables and give it a unique table identification number, Y. But instead of simply writing the entire packet with the payload to the output buffer, the encoding algorithm will also append a status header to the packet indicating that this is a new payload that has just been added to the table at position Y. This extra header could be a fixed length symbol (e.g., of 4 bytes) that is always placed between the network and payload of the packet. The encoding algorithm also uses a flag with each entry in its table which indicates whether the decoding algorithm has installed and acknowledged this particular payload. This "installed" flag is set to 0 (i.e., FALSE) when the payload is first added to the table and the payload is transmitted to the decoding algorithm. When the decoding algorithm receives this packet, it uses the status information to place the payload at position Y of the decoding table. The decoding algorithm then sends back an acknowledgement to the encoding algorithm stating that the payload at position Y has been received and installed. This message is transmitted via the separate reliable transport based synchronization channel. When the encoding algorithm receives this acknowledgement, it sets its local "installed" flag for table entry Y to 1 (i.e., TRUE). This indicates to the encoding algorithm that future instances of this payload can be replaced with the identifier Y since the decoding algorithm has acknowledged that it can de-reference Y to exactly the same payload. Thus the "installed" flag is used by the encoding algorithm to guarantee that every packet that it encodes can be correctly decoded by the decoding algorithm. When the encoding algorithm finds a payload that is identical to a previous payload, it first checks the installed flag of the previous payload. If the installed flag is 0 the payload contents are transmitted and a status flag is appended indicating that the payload has been transmitted before and is currently at table entry number Y in the encoding table. If the installed flag is 1 the status flag is set to indicate that the payload has been replaced with the table entry number Y.

Since each encapsulated packet is transmitted via a non-reliable transport protocol, it is possible for an encapsulated packet to be lost during transmission. This lost packet could contain the first instance of a new payload which would have been added to the decoding table at position Y. In this case, the decoding algorithm will not receive the payload and not add it to table and hence not send back an acknowledgement for this payload. This situation can be remedied when the next instance of the payload is received by the encoding algorithm. This next instance will not be replaced by the encoding algorithm since the installed flag for the payload will still be 0. But if this next instance is not lost then the decoding algorithm will acknowledge its receipt thus allowing the encoding algorithm to replace all future instances of this payload with the identifier Y.

This implicit table synchronization technique can use various other modifications to make it more efficient. For instance, since the number of table entries is limited (i.e., 1 to N), eventually it is possible that the payload at table number X will be deleted and number X will be re-used to refer to a new payload. Since the non-reliable transport protocol may result in out-of-order packet delivery, the re-use of table numbers could under certain circumstances cause the encoding and decoding tables to become non-synchronized. This problem can be avoided by adding a version number to each entry in the table. The version number indicates how many times the table entry has been re-used. Thus not only does the encoding algorithm transmit the table entry at which the payload has been added but the version number of this particular entry as well. Thus both the table number and the version number can be used by the decoding algorithm to ensure that the encoding and decoding tables are synchronized.

The explicit table synchronization described above may be further optimized by allowing for speculative transmission of table references. In this case, the "installed" flag can be automatically changed from 0 to 1 after a pre-determined period of time. This period of time will correspond to approximately the variance in the time of packet delivery between the EE modules 104 and DD modules 106. The encoding algorithm will not wait for the actual acknowledgement from the decoding algorithm but will instead speculate that a payload has been installed by the decoding algorithm after a fixed amount of time (after transmission of this encapsulated payload from the encoding algorithm). After this time, the encoding algorithm will begin to replace future instances of the payload with the table number. If this payload has not been installed by the decoding algorithm (e.g., if the payload was lost), then the decoding algorithm can send back a message indicating that the particular table and version number is not synchronized and should be re-transmitted by the encoding algorithm. This speculative transmission embodiment allows the invention to start replacing payloads with a particular table number sooner than the non-speculative explicit synchronization technique. This is due to the fact that the encoding algorithm does not need to wait for the acknowledgement to come back from the decoding algorithm and instead sets the installed flag to 1 after a shorter period of time.

All of the details described above for the global block encoding algorithm and its multiple table synchronization techniques can be applied to any arbitrary block size. In the above description we used a block size corresponding to the payload size of the packet. In other embodiments, this block size can be set to any other fixed of variable size.

While the present invention has been particularly shown and described with reference to a preferred embodiment, and several alternate embodiments, it will be understood by persons skilled in the relevant art that various changes in form and details can be made therein without departing from the spirit and scope of the invention.

What is claimed is:

1. A system for encoding one or more repetitive data blocks in data communicated over a network comprising:
    an encoder module, coupled in the network, the encoder module intercepting data communicated from a server to a client device, the encoder module extracting data blocks from different communication sessions from the intercepted data, each extracted block having a destination address of the client device, the encoder module determining whether the client device is supported for decoding by at least one corresponding decoder module based on the destination address of the client device, and the encoder module passing through the data when the destination address of the client device is not supported for decoding by a decoder module; and
    a memory, accessible to the encoder module, for storing the contents of one or more data blocks previously transmitted by the encoder module wherein the encoder module determines whether there is a match between the contents of each of the extracted data blocks and the contents of at least one previously transmitted data block,
    wherein the memory comprises a least recently used data structure for storing one or more previously transmitted unique data blocks, said least recently used data structure having a maximum capacity and each of the previously transmitted unique data blocks having a unique identifier and a position in an order of most recently used to least recently used of the one or more stored blocks,
    wherein responsive to said match, the encoder module encodes the respective extracted data block, transmits the respective extracted data block in encoded form to the at least one corresponding decoder module and associates the previously transmitted data block having the matching contents with the position in the least recently used data structure indicating the most recently used previously transmitted data block, and
    wherein responsive to no match, the encoder module transmits the respective extracted data block in intercepted form to the at least one corresponding decoder module.

2. The system of claim 1 wherein the encoded form of the respective extracted data block is transparent to one or more nodes in the network.

3. The system of claim 1 wherein the encoder module is coupled via a switch in a physical connection between two nodes of the network, responsive to a first configuration of the switch, the encoder module processing data that traverse the physical connection between these two nodes, and responsive to a second configuration of the switch, the data bypassing the encoder module.

4. The system of claim 1 wherein the encoder module operates in a node in the network and decides a route for the respective extracted data block to the at least one corresponding decoder module supporting its destination address.

5. The system of claim 1 wherein the encoder module, responsive to a match in contents, transmits art indicator, identifying that the contents of a respective data block have been previously transmitted.

6. The system of claim 5 wherein the indicator is a special symbol.

7. The system of claim 5 wherein the indicator is an extra header.

8. The system of claim 1 wherein at least one respective data block is a pacter payload.

9. The system of claim 1 wherein at least one respective data block is a portion of a packet payload.

10. The system of claim 1 wherein the encoder module encodes at least one extracted data block using a synchronization mechanism for verifying the identification of the one or more previously transmitted data blocks with the at least one corresponding decoder module supporting the destination address of the extracted data block.

11. The system of claim 10 wherein the synchronization mechanism is an explicit synchronization mechanism.

12. The system of claim 10 wherein the synchronization mechanism is an implicit synchronization mechanism.

13. The system of claim 10 wherein the implicit synchronization mechanism is a reliable network transport protocol.

14. The system of claim 1 further comprising the encoder module, responsive to no match between the contents of the respective extracted data block and the contents of at least one of the previously transmitted blocks, determining whether to delete at least one of the previously transmitted data blocks in the memory, and storing the respective extracted data block in intercepted form in the memory.

15. A system for encoding one or more repetitive data blocks in data communicated over a network comprising:
    an encoder module, coupled in the network, the encoder module intercepting data communicated from at least one server to at least one client device, the encoder module extracting data blocks from different communication sessions from the intercepted data, each extracted block having a destination address of the client device to which the extracted data block is destined, the encoder module determining whether the client device is supported for decoding by at least one corresponding decoder module based on the destination address of the client device, and the encoder module passing through data when the destination address of the client device is not supported for decoding by a decoder module; and
    a memory, accessible to the encoder module, having a least recently used data structure for storing the contents of one or more unique data blocks previously transmitted by the encoder module, said least recently used data structure having a maximum capacity and each of the previously transmitted unique data blocks having a unique identifier and a position in an order of most recently used to least recently used of the one or more stored blocks,
    wherein the encoder module determines whether there is a match between the contents of each of the extracted data blocks and the contents of at least one previously transmitted data block, wherein responsive to said match, die encoder module encodes the respective extracted data block and transmits the respective extracted data block in encoded form to the at least one corresponding decoder module, and wherein responsive to no match, the encoder module transmits the respective extracted data block in intercepted form to the at least one corresponding decoder module, stores the extracted data block in the least recently used data structure, and associates the position of most recently used with the extracted data block.

16. The system of claim 15 wherein, responsive to the least recently used data structure being at the maximum capacity, the encoder module deletes the previously transmitted data block having the order position of the least recently used data block.

17. A system for encoding one or more repetitive data blocks in data communicated over a network comprising:

an encoder module, coupled in the network, the encoder module intercepting the data, the encoder module extracting data blocks from different communication sessions from the intercepted data;

a memory, accessible to the encoder module, having a least recently used data structure for storing the contents of one or more unique data blocks previously transmitted by the encoder module, said least recently used data structure having a maximum capacity and each of the previously transmitted unique data blocks having a unique identifier and a position in an order of mast recently used to least recently used of the one or more stored blocks, wherein, responsive to the least recently used data structure being at the maximum capacity, the encoder module deletes the previously transmitted data block having the order position of the least recently used data block, wherein the encoder module determines whether there is a match between the contents of each of the extracted data blocks and the contents of at least one previously transmitted data block, wherein responsive to said match, the encoder module encodes the respective extracted data block and transmits the respective extracted data block in encoded form to at least one corresponding decoder module, and wherein responsive to no match, the encoder module transmits the respective extracted data block in intercepted form to the at least one corresponding decoder module, stores the extracted data block in the least recently used data structure, and associates the position of most recently used with the extracted data block; and a synchronization mechanism including a same size for the least recently used data structure as the size of a second least recently used data structure accessible by the corresponding decoder module receiving the respective extracted data block, and a reliable network transport protocol being used for the transmission of the respective extracted data block.

18. A system for encoding one or more repetitive data blocks in data communicated over a network comprising:

an encoder module, coupled in the network, the encoder module intercepting the data, the encoder module extracting data blocks from different communication sessions from the intercepted data;

a memory, accessible to the encoder module, having a least recently used data structure for storing the contents of one or more unique data blocks previously transmitted by the encoder module, said least recently used data structure having a maximum capacity and each of the previously transmitted unique data blocks having a unique identifier and a position in an order of most recently used to least recently used of the one or more stored blocks, wherein, responsive to the least recently used data structure being at the maximum capacity, the encoder module deletes the previously transmitted data block having the order position of the least recently used data block, wherein the encoder module determines whether there is a match between the contents of each of the extracted data blocks and the contents of at least one previously transmitted data block, wherein responsive to said match, the encoder module encodes the respective extracted data block and transmits the respective extracted data block in encoded form to at least one corresponding decoder module, and wherein responsive to no match, the encoder module transmits the respective extracted data block in intercepted form to the at least one corresponding decoder module, stores the extracted data block in the least recently used data structure, and associates the position of most recently used with the extracted data block; and a synchronization mechanism including an indicator for each transmitted extracted data block indicating whether the data block has been associated with the least recently used data structure and an installed flag associated with each of the previously transmitted data blocks in the least recently used data structure, the installed flag indicating whether the associated data block has been stored in a second least recently used data structure accessible by the corresponding decoder module that has received the respective extracted data block.

19. The system of claim 18 wherein the installed flag is updated after a fixed amount of time after transmission of the data block.

20. The system of claim 18 wherein the installed flag is updated responsive to a notification from the corresponding decoder module that the associated data block has been stored in the second least recently used data structure.

21. The system of claim 1 wherein the memory stores a data structure for associating a signature with one or more of the previously transmitted data blocks, and wherein the encoder module computes a signature for the respective extracted data block, compares the computed signature with at Least one signature associated with the one or more previously transmitted data blocks, and responsive to a match in signature, selecting the one or more previously transmitted data blocks having the match in signature for content comparison with the respective extracted data block.

22. The system of claim 21 wherein the data structure for associating a signature with one or more of the previously transmitted data blocks is a hash table having one or more bins.

23. A system for encoding one or more repetitive data blocks in data communicated over a network comprising:

an encoder module intercepting the data and extracting data blocks from different communication sessions from the intercepted data, each extracted block having a destination address of a client device to which the extracted data block is destined and that is supported for decoding by at least one corresponding decoder module, and the encoder module passing through data not having a supported destination address;

a memory, accessible to the encoder module, for storing the contents of one or more data blocks previously transmitted by the encoder module; and a hash table having one or more bins for associating a signature with one or more of the previously transmitted data blocks, wherein the encoder module determines whether there is a match between the contents of each of the extracted data blocks and the contents of at least one previously transmitted data block by computing a signature for the respective extracted data block and comparing the computed signature with at least one signature associated with the one or more previously transmitted data blocks, the computed signature value being less than the number of hash table bins, wherein, responsive to a match in signature, the encoder selects the one or more previously transmitted data blocks having the match in signature for content comparison with the respective extracted data block, encodes the respective extracted data block and transmits the respective extracted data block in encoded form to the at least one corresponding decoder module, and wherein, responsive to no match, the encoder module transmits the respective extracted data block in intercepted form to the at least one corresponding decoder module.

24. A system for encoding one or more repetitive data blocks in data communicated over a network comprising:

an encoder module intercepting the data and extracting data blocks from different communication sessions from the intercepted data, each extracted block having a destination address of a client device to which the extracted data block is destined and that is supported for decoding by at least one corresponding decoder module, and the encoder module passing through data not having a supported destination address;

a memory, accessible to the encoder module, for storing the contents of one or more data blocks previously transmitted by the encoder module; and a hash table having one or more bins for associating a signature with one or more of the previously transmitted data blocks, wherein the encoder module determines whether there is a match between the contents of each of the extracted data blocks and the contents of at least one previously transmitted data block by computing a signature for the respective extracted data block and comparing the computed signature with at least one signature associated with the one or more previously transmitted data blocks, the computed signature value being computed as a modulo of the number of bins, wherein, responsive to a match in signature, the encoder selects the one or more previously transmitted data blocks baying the match in signature for content comparison with the respective extracted data block, encodes the respective extracted data block and transmits the respective extracted data block in encoded form to the at least one corresponding decoder module, and wherein, responsive to no match, the encoder module transmits the respective extracted data block in intercepted form to the at least one corresponding decoder module.

25. The system of claim 1 further comprising an encapsulation module for encapsulating the extracted data blocks for transport over the network.

26. The system of claim 25 wherein at least one of the extracted data blocks is included in a packet, and the packet is encapsulated as one packet.

27. The system of claim 25 wherein at least one of the extracted data blocks is included in a packet and the packet is encapsulated with at least one other packet in an outgoing packet for transmission.

28. The system of claim 25 wherein the encapsulation of at least one of the extracted data blocks is transparent to one or more nodes in the network.

29. The system of claim 25 wherein the encapsulation module comprises a timer mechanism for ensuring that the at least one extracted data block is held in a buffer coupled to the encapsulation module for no more than a pre-determined maximum time before being transmitted.

30. The system of claim 27 wherein the encapsulation module comprises a timer mechanism for ensuring that the at least one extracted data block is held in a buffer coupled to the encapsulation module for no more than a pre-determined maximum time before being transmitted.

31. The system of claim 25 wherein the encoder module encodes at least one data block at a first layer of a model describing the flow of data across a network and the encapsulation module encapsulates the at least one extracted data block at a second layer of the model.

32. The system of claim 31 wherein the first and second layers are at the same layer of the model.

33. The system of claim 32 wherein one of the layers is a connection-oriented layer and the other layer is a connectionless layer.

34. A system for encoding one or more repetitive data blocks in data communicated over a network comprising:

an encoder module intercepting data communicated from a server to a client device and extracting data blocks from different communication sessions from the intercepted data, each extracted block having a destination address of the client device, the encoder module determining whether the client device is supported for decoding by at least one corresponding decoder module based on the destination address of the client device, and the encoder module passing through the data when the destination address of the client device is not supported for decoding by a decoder module; and a memory, accessible to the encoder module, for storing the contents of one or more data blocks previously transmitted by the encoder module, wherein the encoder module determines whether there is a match between the contents of each of the extracted data blocks and the contents of at least one previously transmitted data block, wherein responsive to said match, the encoder module encodes the respective extracted data block and transmits the respective extracted data block in encoded form to the at least one corresponding decoder module, wherein responsive to no match, the encoder module transmits the respective extracted data block in intercepted form to the at least one corresponding decoder module, and wherein the encoder module receives routing information in accordance with a routing protocol over the network from each of one or mote corresponding decoder modules with which it communicates and determines the one or more addresses supported by each respective decoder module from the routing information, wherein the routing information includes network topology information for the network.

35. The system of claim 34 wherein the encoder module determines the network topology information based upon the routing information from the one or more decoder modules.

36. The system of claim 35 wherein, responsive to multiple decoder modules in the network supporting the same address, the encoder module determines a destination decoder module for one or more extracted data blocks based upon network topology information and routing criteria.

37. The system of claim 35 wherein the routing criteria includes routing cost.

38. The system of claim 35 wherein the routing criteria includes routing distance.

39. A system for decoding one or more repetitive data blocks in data communicated over a network comprising:
a decoder module being coupled in the network, the decoder module transmitting routing information over the network to a corresponding encoder module in accordance with a routing protocol, the routing information including network topology information for the network and identifying one or more addresses of client devices that the decoder module supports to control selective encoding of data at the encoder module based on the client devices supported by the decoder module by determining with the encoder module whether client devices are supported for decoding by at least one corresponding decoder module based on destination addresses of the client devices and passing through the data when the destination addresses of the client devices are not supported by decoding by a decoder module, the decoder module receiving data blocks for different communication sessions from the corresponding encoder module, each of the data blocks having a destination address of a client device to which the extracted data block is destined; and
a memory accessible to the decoder module for storing the contents of one or more data blocks previously received from the corresponding encoder module wherein the decoder module determines whether the contents of each of the received data blocks is in encoded form,
wherein the memory stores the previously received data blocks in a least recently used data structure for storing one or more previously received unique data blocks, the least recently used data structure having a maximum capacity and each of the previously received unique data blocks having a unique identifier and a position in an order of most recently used to least recently used of the one or more previously received blocks,
wherein responsive to the respective data block being in encoded form, the decoder module selects the contents of a matching previously received block as the contents for the respective encoded block and associates the previously received data block having the matching contents with the position in the least recently used data structure indicating the most recently used previously received data, and
wherein responsive to the data block being encoded, the decoder module stores the contents of the respective received data block as a previously received data block.

40. The system of claim 39 wherein the decoder module is coupled via a switch in a physical connection between two nodes of the network, responsive to a first configuration of the switch, the encoder module processing data that traverse the physical connection between these two nodes, and responsive to a second configuration of the switch, the data bypassing the decoder module.

41. The system of claim 39 wherein the decoder module operates in a node in the network and decides a route for a decoded data block to its destination address.

42. The system of claim 39 wherein the decoder module receives an indicator for identifying that the contents of at least one encoded data block have been previously transmitted to the decoder module.

43. The system of claim 42 wherein the indicator is a special symbol.

44. The system of claim 42 wherein the indicator is an extra header.

45. The system of claim 39 wherein at least one encoded data block is a packet payload.

46. The system of claim 39 wherein at least one encoded data block is a portion of a packet payload.

47. The system of claim 39 wherein the decoder module decodes at least one encoded data block using a synchronization mechanism for verifying the identification of the one or more previously received data blocks from a corresponding encoder module.

48. The system of claim 47 wherein the synchronization mechanism is an explicit synchronization mechanism.

49. The system of claim 47 wherein the synchronization mechanism is en implicit synchronization mechanism.

50. The system of claim 49 wherein the implicit synchronization mechanism is a reliable network transport protocol.

51. The system of claim 47 wherein the synchronization mechanism is a reliable network transport protocol.

52. The system of claim 39 wherein responsive to the data block being unencoded, the decoder module stores the contents of the respective received data block as a previously received data block further comprises determining whether to delete at least one of the previously received data blocks.

53. The system of claim 39 wherein the decoder module, responsive to no match in contents between the respective received data block and any one of the previously received data blocks, stores the respective received data block in the least recently used data structure, and associates the position of most recently used with the respective received data block.

54. The system of claim 53 further comprising: responsive to the least recently used data structure being at the maximum capacity, storing the respective received data block in the least recently used data structure comprises replacing the previously received data block having the order position of least recently used data block with the respective received data block.

55. A system for decoding one or more repetitive data blocks in data communicated over a network comprising:
a decoder module receiving data blocks from an encoder module;
a memory having a least recently used data structure for storing one or more previously received unique data blocks, each of the previously received unique data blocks having a unique identifier and a position from a most recently used to least recently used of the one or more previously received blocks;
a synchronization mechanism including a same size for the least recently used data structure as the size of a second least recently used data structure accessible by the corresponding encoder module that transmitted the respective received data block, a reliable network transport protocol being used for the transmission of the respective received data block,
wherein the decoder module determines whether the contents of each of the received data blocks is in encoded form,
wherein responsive to the respective data block being in encoded four, the decoder module selects the contents of a matching previously received block as the contents for the respective encoded block, and wherein responsive to the data block being unencoded, the decoder module stores the contents of the respective received data block as a previously received data block.

56. A system for decoding one or more repetitive data blocks in data communicated over a network comprising:

a decoder module receiving data blocks from an encoder module;

a memory having a least recently used data structure for storing one or more previously received unique data blocks, each of the previously received unique data blocks having a unique identifier and a position from a most recently used to least recently used of the one or more previously received blocks;

a synchronization mechanism including a same size for the least recently used data structure as the size of a second least recently used data structure accessible by the corresponding encoder module, an indicator for each received data block indicating whether the received data block has been previously associated with the second least recently used data structure, and an installation acknowledgement transmitting by the decoder module to the corresponding encoder module responsive to an installation of each received block in the least recently used data structure, wherein the decoder module determines whether the contents of each of the received data blocks is in encoded form, wherein responsive to the respective data block being in encoded form, the decoder module selects the contents of a matching previously received block as the contents for the respective encoded block, and wherein responsive to the data block being unencoded, the decoder module stores the contents of the respective received data block as a previously received data block.

57. A system for decoding one or more repetitive data blocks in data communicated over a network comprising:

a decoder module receiving data blocks from an encoder module;

a memory having a least recently used data structure for storing one or more previously received unique data blocks, each of the previously received unique data blocks having a unique identifier and a position from a most recently used to least recently used of the one or more previously received blocks;

a synchronization mechanism wherein the decoder module receives a version number of the previously received data block having the matching contents, the version number indicating bow many times the identifier for this data block has been re-used, wherein the decoder module determines whether the contents of each of the received data blocks is in encoded form, wherein responsive to the respective data block being in encoded form, the decoder module selects the contents of a matching previously received block as the contents for the respective encoded block, and wherein responsive to the data block being unencoded, the decoder module stores the contents of the respective received data block as a previously received data block.

58. The system of claim 39 wherein the system further comprises a decapsulation module for decapsulating a block of data received over the network from a source address supported by a corresponding encoder module.

59. The system of claim 58 wherein the received data block is included in a packet, and the packet has been decapsulated as one packet.

60. The system of claim 58 wherein the received data block is included in a packet and the packet has been decapsulated with at least one other packet in an outgoing packet transmitted from a source address supported by a corresponding encoder module.

61. The system of claim 58 wherein the decapsulation module decapsulates the received block of data at a first layer of a model describing the flow of data across a network and the decoder module decodes the received block of data at a second layer of the model.

62. The system of claim 61 wherein the first layer and the second layer are the same layer.

63. The system of claim 61 wherein one of the layers is a connection-oriented layer and the other layer is a connectionless layer.

64. A system for decoding one or more repetitive data blocks in data communicated over a network comprising:

a decoder module that transmits to the encoder module over the network routing information in accordance with a routing protocol, the routing information including network topology information for the network for identifying one or more addresses of client devices that the decoder module supports to control selective encoding of data at the encoder module based on the client devices supported by the decoder module by determining with the encoder module whether client devices are supported for decoding by at least one corresponding decoder module based on destination addresses of the client devices and passing through the data when the destination addresses of the client devices are not supported for decoding by a decoder module, the decoder module receiving data blocks from an encoder module; and a memory accessible to the decoder module for storing the contents of one or more of the data blocks previously received from the encoder module, wherein the decoder module determines whether the contents of each of the received data blocks is in encoded form, wherein responsive to the respective data block being in encoded form, the decoder module selects the contents of a matching previously received block as the contents for the respective encoded block, and wherein responsive to the data block being unencoded, the decoder module stores the contents of the respective received data block as a previously received data block.

65. The system of claim 64 wherein the decoder module participates in one or more routing protocols for obtaining routing information.

66. A system for decreasing one or more repetitive data blocks in data communicated over a network comprising:

an encoder module, coupled in the network, the encoder module intercepting the data, the encoder module extracting data blocks from different communication sessions from the intercepted data, each extracted block having a destination address of a client device to which the extracted date block is destined, the encoder module determining whether the client device is supported for decoding by at least one corresponding decoder module based on the destination address of the client device, and the encoder module passing through the data when the destination address of the client device that is not supported for decoding by at least one decoder module;

a first memory, accessible to the encoder module, for storing the contents of one or more data blocks previously transmitted by the encoder module, wherein the encoder module determines whether there is a match between the contents of each of the extracted data blocks and the contents of at least one previously transmitted data block, wherein responsive to a match, the encoder module encodes the respective extracted data block and transmits the respective extracted data block in encoded form to the at least one corresponding decoder module, and responsive to no match, the encoder module transmits the respective extracted data block in intercepted form to the at least one corresponding decoder module;

the at least one corresponding decoder module being coupled in the network, the decoder module receiving data blocks for different communication sessions from the encoder module; and a second memory accessible to the decoder module for storing the contents of one or more data blacks previously received from the encoder module, wherein the at least one corresponding decoder module determines whether the contents of each of the received data blocks is in encoded form, wherein responsive to the respective data block being in encoded form, the decoder module selects the contents of a matching previously received block as the contents for the respective encoded block, and responsive to the data block being unencoded, the decoder module stores the contents of the respective received data block as a previously received data block, and wherein the decoder module transmits routing information in accordance with a routing protocol, the routing information including network topology information for the network for identifying one or more addresses it supports over the network to the encoder module.

67. A method for encoding one or more repetitive data blocks in data communicated over a network comprising:

receiving routing information in accordance with a routing protocol over the network from one or more decoder modules, the routing information including network topology information for the network;

determining, from the routing information, one or more destination addresses of client devices that is supported by each respective decoder module;

intercepting data communicated from a server to a client device;

extracting data blocks from different communication sessions from the intercepted data, each extracted block having a destination addresses for the client device to which the intercepted data in destined;

passing through the data when the destination address of the client device to which the intercepted data is destined is not one of the client devices supported for decoding by the one or more decoder modules;

storing the contents of one or more data blocks previously transmitted;

determining whether there is a match between the contents of each of the extracted data blocks and the contents of at least one previously transmitted data block;

responsive to a match encoding the respective extracted data block, and transmitting the respective extracted data block in encoded form to the at least one corresponding decoder module; and responsive to no match, the encoder module transmitting over the network the respective extracted data block in intercepted form.

68. The method of claim 67 further comprising responsive to a match in contents, transmitting an indicator for identifying that the contents of a respective data block have been previously transmitted.

69. The method of claim 67 further comprising synchronizing the identification of the one or more previously transmitted data blacks with at least one corresponding decoder module supporting the destination address of the extracted data block.

70. The method of claim 67 further comprising, responsive to no match between the contents of the respective extracted data black and the contents of at least one of the previously transmitted blocks, determining whether to delete at least one of the previously transmitted data blocks in the memory, and storing the respective extracted data block in intercepted form in the memory.

71. The method of claim 67 wherein storing the contents of one or more data blocks previously transmitted comprises storing one or more previously transmitted unique data blocks in a least recently used data structure, said least recently used data structure having a maximum capacity and each of the previously transmitted unique data blocks having a unique identifier and a position in an order of most recently used to least recently used of the one or more stored blocks.

72. A method for encoding one or more repetitive data blocks in data communicated over a network comprising:

intercepting data communicated from at least one server to at least one client device;

extracting data blocks from different communication sessions from the intercepted data, each extracted block having a destination address of the client device to which the extracted data block is destined and determining, based on the destination address of the client device, whether the client device is supported for decoding by at least one corresponding decoder module;

passing through the data when the destination address of the client device to which the intercepted data is destined is not supported for decoding by the at least one corresponding decoder module;

storing one or more previously transmitted unique data blocks in a least recently used data structure, each of the previously transmitted unique data blocks having a unique identifier and a position in an order of most recently used to least recently used of the one or more stored blocks;

determining whether there is a match between the contents of each of the extracted data blocks and the contents of at least one previously transmitted data block;

responsive to a match in contents, encoding the respective extracted data block, transmitting the respective extracted data block in encoded form to the at least one corresponding decoder module, and associating the previously transmitted data block having the matching contents with the position in the least recently used data structure indicating the most recently used previously transmitted data block; and responsive to no match, transmitting over the network the respective extracted data block in intercepted form.

73. The method of claim 71 further comprising, responsive to no match between the contents of an extracted data block and the contents of one of the previously transmitted data blocks, storing the extracted data block in the least recently used data structure, and associating the position of most recently used with the extracted data block.

74. The method of claim 73 further comprising:
responsive to the least recently used data structure being at the maximum capacity,
deleting the previously transmitted data block having the order position of least recently used data block.

75. The method of claim 74 further comprising encoding at least one data block at a first layer of a model describing the flow of data across a network and the encapsulating the at least one extracted data block at a second layer of the model.

76. The method of claim 75 wherein one of the layers is a connection-oriented layer and the other layer is a connectionless layer.

77. The method of claim 67 further comprising determining network topology information based upon the routing information from the one or more decoder modules.

78. The method of claim 77 further comprising responsive to multiple decoder modules in the network supporting the same address, determining a destination decoder module for one or more extracted data blocks based upon network topology information and routing criteria.

79. A method for decoding one or more repetitive data blocks in data communicated over a network comprising:
transmitting routing information in accordance with a routing protocol for identifying one or more addresses of client devices that a decoder module supports over a network to an encoder module, to control selective encoding of data at the encoder module based on the client devices supported by the decoder module by determining with the encoder module whether client devices are supported for decoding by at least one corresponding decoder module based on destination addresses of the client devices and passing through the data when the destination addresses of the client devices are not supported for decoding by a decoder module, wherein the routing information includes network topology information for the network;
receiving data blocks with the decoder module for different communication sessions from the encoder module;
storing the contents of one or more data blocks previously received from the encoder module;
determining whether the contents of each of the received data blocks is in encoded form;
responsive to the respective data block being in encoded form, selecting the contents of a matching previously received block as the contents for the respective encoded block; and
responsive to the data block being unencoded, storing the contents of the respective received data block as a previously received data block.

80. The method of claim 79 further comprising receiving an indicator for identifying that the contents of at least one encoded data block have been previously transmitted to the decoder module.

81. The method of claim 79 further comprising the identification of the one or more previously received data blocks from a corresponding encoder module.

82. The method of claim 79 further comprising responsive to the data block being unencoded, storing the contents of the respective received data block as a previously received data block further comprises determining whether to delete at least one of the previously received data blocks.

83. The method of claim 79 wherein storing the previously received data blocks further comprises storing one or more previously received unique data blocks in a least recently used data structure, the least recently used data structure having a maximum capacity and each of the previously received unique data blocks having a unique identifier and a position in an order of most recently used to least recently used of the one or more previously received blocks.

84. The method of claim 83 further comprising responsive to a match in contents, associates the previously received data block having the matching contents with the position in the least recently used data structure indicating the most recently used previously received data block.

85. The method of claim 83 further comprising responsive to no match in contents between the respective received data block and any one of the previously received data blocks, storing the respective received data block in the least recently used data structure, and associating the position of most recently used with the respective received data block.

86. The method of claim 85 further comprising: responsive to the least recently used data structure being at the maximum capacity, deleting the previously received data block having the order position of least recently used data block.

87. The method of claim 79 further comprising decapsulating the received block of data at a first layer of a model describing the flow of data across a network and decoding the received block of data at a second layer of the model.

88. The method of claim 87 wherein the first layer and the second layer are the same layer.

89. The method of claim 88 wherein one of the layers is a connection-oriented layer and the other layer is a connectionless layer.

* * * * *

UNITED STATES PATENT AND TRADEMARK OFFICE
CERTIFICATE OF CORRECTION

| | | |
|---|---|---|
| PATENT NO. | : 7,336,682 B2 | Page 1 of 1 |
| APPLICATION NO. | : 09/915939 | |
| DATED | : February 26, 2008 | |
| INVENTOR(S) | : Singh | |

It is certified that error appears in the above-identified patent and that said Letters Patent is hereby corrected as shown below:

Column 18, line 8, "transmits art indicator" should read -- transmits an indicator --

Column 18, line 16, "is a pacter payload" should read -- is a packet payload --

Column 19, line 1, "said match, die encoder" should read -- said match, the encoder --

Column 19, line 30, "mast recently used" should read -- most recently used --

Column 20, line 46, "at Least one" should read -- at least one --

Column 21, line 52, "blocks baying the" should read -- blocks having the --

Column 22, line 58, "or mote corresponding" should read -- or more corresponding --

Column 23, line 26, "supported by decoding" should read -- supported for decoding --

Column 24, line 21, "is en implicit" should read -- is an implicit --

Column 24, line 67, "encoded four" should read -- encoded form --

Column 25, line 51, "indicating bow many" should read -- indicating how many --

Column 27, line 52, "data in destined" should read -- data is destined --

Column 28, line 15, "extracted data black" should read -- extracted data block --

Signed and Sealed this
Nineteenth Day of April, 2011

David J. Kappos
*Director of the United States Patent and Trademark Office*